June 3, 1941.  F. S. SAUNDERS  2,244,404
APPARATUS FOR TESTING SPARK PLUGS
Filed March 6, 1940  4 Sheets-Sheet 2

Inventor
Frank Stanley Saunders.
by
A. Knight Croad
Attorney

June 3, 1941.   F. S. SAUNDERS   2,244,404
APPARATUS FOR TESTING SPARK PLUGS
Filed March 6, 1940   4 Sheets-Sheet 3

Inventor
Frank Stanley Saunders.
by
A. Knight Croad
Attorney

June 3, 1941.  F. S. SAUNDERS  2,244,404
APPARATUS FOR TESTING SPARK PLUGS
Filed March 6, 1940   4 Sheets-Sheet 4

Inventor
Frank Stanley Saunders.
by A. Knight Broad
Attorney

Patented June 3, 1941

2,244,404

UNITED STATES PATENT OFFICE 2,244,404

APPARATUS FOR TESTING SPARK PLUGS

Frank Stanley Saunders, Southampton, England

Application March 6, 1940, Serial No. 322,519
In Great Britain March 21, 1939

8 Claims. (Cl. 175—183)

This invention relates to apparatus for testing sparking plugs and it has for its object the provision of a device by means of which a plug may be simultaneously tested for ignition and for pressure leakages at any of its glands, and to this end according to this invention the apparatus comprises means for receiving and holding the plug in a compression chamber, means for locking the plug in the holding means, means for supplying a predetermined volume of air to the compression chamber and means for establishing an electric circuit through said plug, all of said means being simultaneously actuated by the depression of a single handle or lever, and means for locking said handle or lever in the operative position.

In the accompanying drawings which illustrate this invention:

Figure 1:
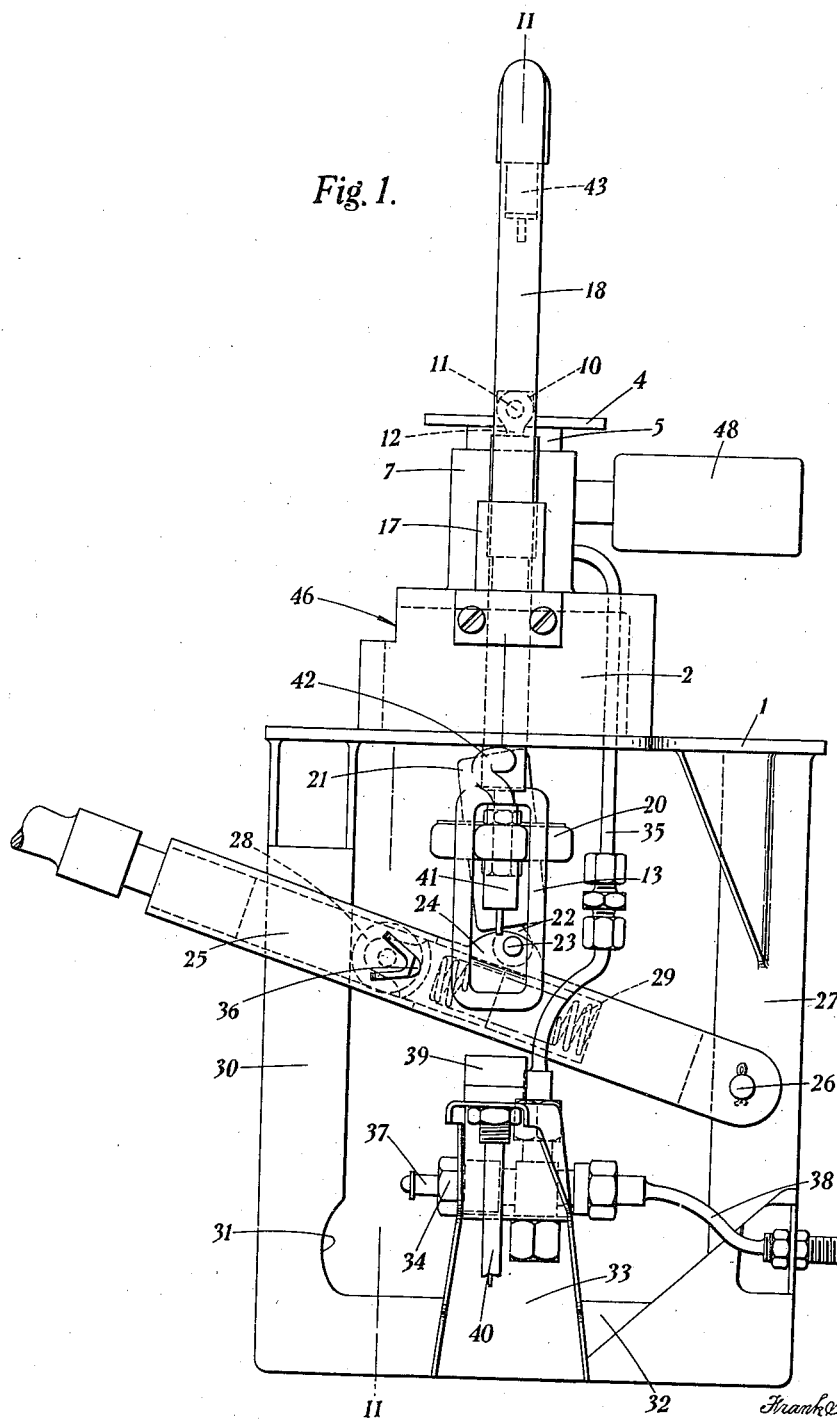
Figure 1 is a side elevation of one embodiment of this invention.
Figure 2:
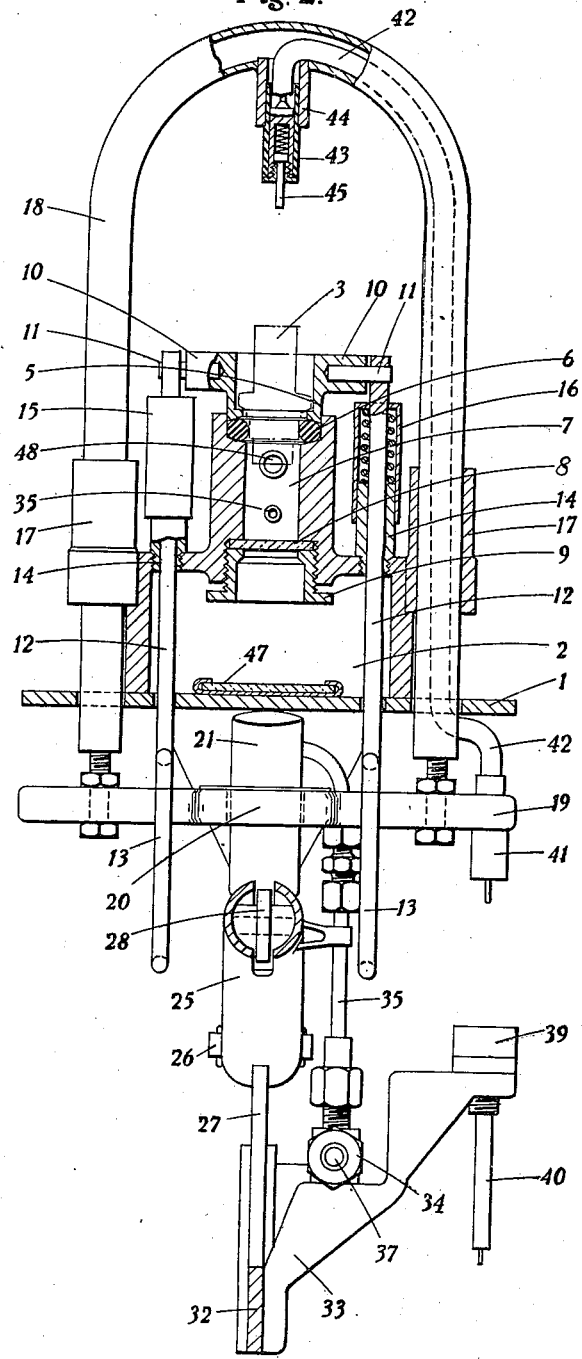
Figure 2 is a part section on line II—II of Figure 1.

According to the embodiment of this invention illustrated in Figures 1 and 2 the apparatus comprises a main plate 1 adapted to support on its upper face a plug holding device forming part of a compression chamber furnished with a pressure gauge, an inspection chamber and bearings for certain moving parts actuated by means located below the main plate 1. More particularly stated the parts above the plate 1 comprise an inspection chamber 2 with means for receiving and holding a plug, indicated by broken lines 3 in Figure 2, in the upper part thereof, said latter part comprising a presser plate 4 provided with an annular ring or part 5 adapted to bear on an india-rubber ring 6 seated in an annular recess at the top of the compression chamber 7, the bottom of which is formed of a transparent material, such as a circular disc 8 of plate glass maintained in position by a screw threaded element 9. The presser plate 4 is furnished with two oppositely disposed lugs 10 provided with pins 11 upon each of which is mounted the upper end of a rod 12 which extends downwardly through the inspection chamber 2 and main plate 1 and terminates in a loop shaped part 13 for the purpose hereafter described. The rods 12 are arranged to slide in parts 14 secured to the top of the inspection chamber 2 and a tubular member 15 is slidably arranged on said parts, springs 16 being located between the parts 14 and 15 which normally maintain the presser plate 4 in its highest position. The main plate 1 is further provided on either side of the inspection chamber 2 with a guide way 17 for the legs of a vertically disposed inverted U-shaped member 18, the lower ends of the two legs being connected together by a transversely disposed cross-head 19, the opposite ends of said cross-head passing through the loop 13 on each of the downwardly extending rods 12. The centre part of the cross-head 19 is formed as a type of gimbal 20 in which is pivotally mounted a vertically disposed tubular member 21 adapted to contain a spring controlled member 22, the lower end of which is pivotally mounted on a pin 23 secured in a lug 24 provided on an operating handle or lever 25, the rear end of which is pivoted at 26 to the rear depending frame member 27 secured to the underside of the main plate 1. The operating handle 25 is of tubular formation and is furnished with a roller 28 pressed by a spring 29 against the front depending frame member 30 provided with a cam surface or recess 31 into which the roller 28 is pressed when the handle 25 reaches its lowermost position. The lower frame member 32 is provided with a bracket 33 adapted to support a spring controlled valve 34 regulating the supply of compressed air to the compression chamber 2 with which it is connected by a pipe 35, means 36 being provided on the operating handle 25 adapted to coact with a plunger element 37 forming part of the valve 34, whereby the required volume of air from the source of supply through the pipe 38, is supplied to the compression chamber at a predetermined time, a non-return valve being provided between the supply valve 34 and the compression chamber 2. The bracket 33 is further adapted to support one element 39 of an electric contact device directly connected by a lead 40 to a source of high tension current such as the secondary of a magneto (or induction coil) the coacting element 41 of said contact device being mounted on the cross-head 19 secured to the lower ends of the U-shaped member 18, through one leg of which is passed a lead or conductor 42 to a second contact device 43 mounted in a part 44 depending from the centre of the arch coaxial with the holder for the sparking plug, said part 43 being furnished with a spring controlled member 45 adapted to make contact with the central electrode of the plug.

In order that the apparatus as above described may be used for testing sparking plugs of different sizes, it is preferable that the aperture in the top of the compression chamber 7 should be made large enough to receive the largest size of plug normally used and that the presser plate 4 for receiving and holding the plug and for locking the plug therein, that is, the india-rubber ring 6 and the presser plate 4, should be made easily removable and interchangeable. For the same purpose the contact device 43 mounted in the part 44 depending from the centre of the arch coaxial with the plug holder is so mounted or formed that the extent to which it depends towards the plug may be readily varied according to the size of the plug being tested.

In operation, assuming the apparatus has been securely fixed to the bench and the pipe 38 connected to a compressed air supply and the lead 40 to a source of current, a sparking plug 3 is inserted in the presser plate 4, the operating handle 25 is depressed, the contact device 45 on the arch of the U-shaped member is brought down into contact with the inner electrode of the plug 3 which is simultaneously locked and sealed in the holder, the necessary volume of compressed air is supplied to the compression chamber 7 as the handle 25 reaches and passes into its lowermost position, and the contact device 41 on the crosshead 19 is brought into contact with its coacting part 39 on the bracket 33 and an electric circuit is completed to the plug. Assuming the plug to be in order, the sparking at the electrodes may be viewed, through an aperture 46 in the wall of the inspection chamber 2, in a mirror 47 located at the bottom thereof, and any pressure leakage of air through the glands of the plug will be shown on the pressure gauge 48.

Figure 3:
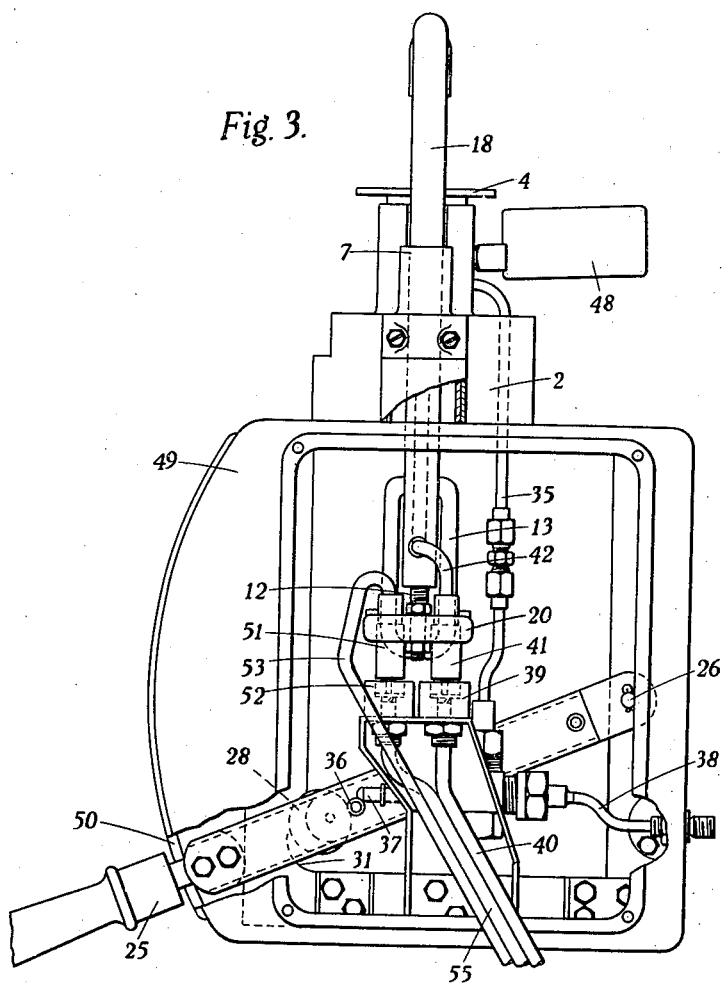
Figure 3 is a side elevation of a further embodiment of this invention.
Figure 4:
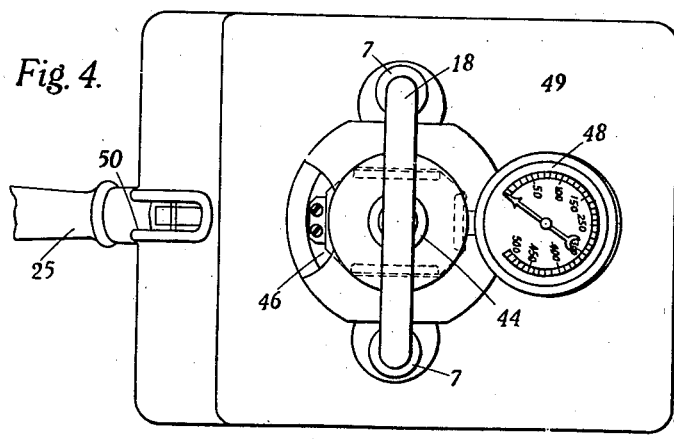
Figure 4 is a plan.
Figure 5:
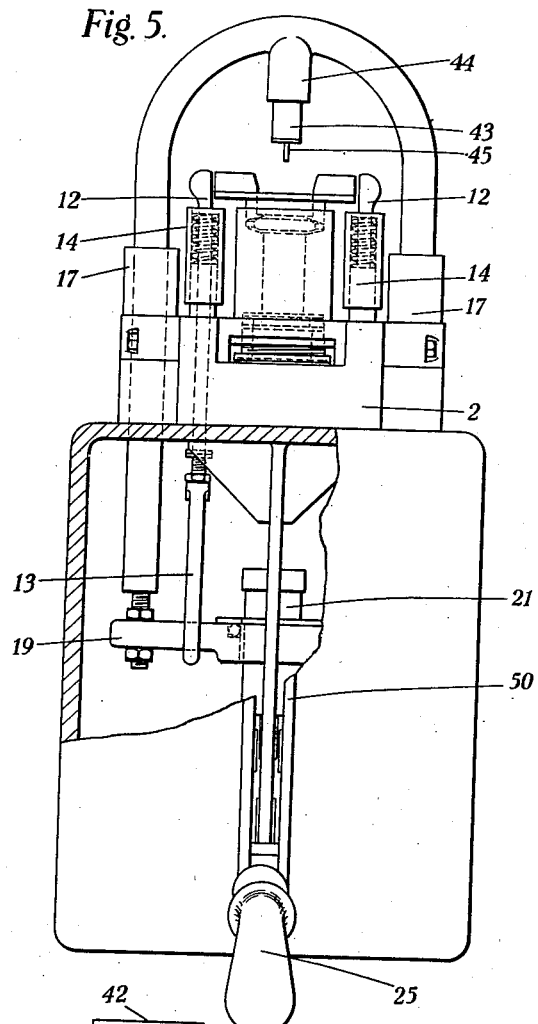
Figure 5 is a front elevation thereof.
Figure 6:
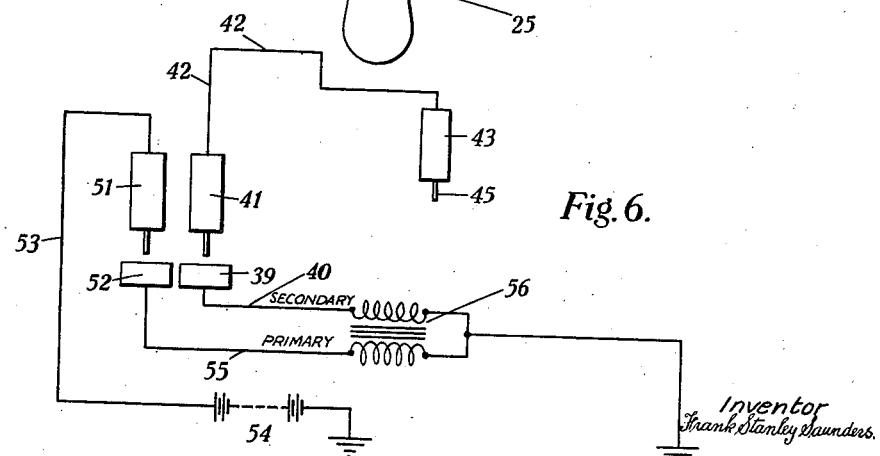
Figure 6 is a wiring diagram.

The preferred form of the invention is illustrated in Figures 3, 4 and 5 according to which practically the whole of the operative parts below the main plate 1 are contained within a suitable casing 49, the front plate of which is of arcuate form and provided with a vertically disposed slot 50 in which the handle 25 is adapted to slide. The main features of the device are substantially the same as those above described with reference to Figures 1 and 2, but the crosshead 19 is furnished with two contact devices 41 and 51 and the bracket 33 with coacting elements 39 and 52, the circuits being arranged as shown in the circuit diagram (Figure 6). As in the construction first described the contact devices 39 and 41 are arranged in the high tension circuit whereas the contact devices 51 and 52 are arranged in the low tension circuit, the device 51 being connected by a lead 53 to one side of the battery 54 and the contact 52 by the lead 55 to the primary of the coil 56. By the provision of the additional automatic switch in the low tension circuit the slow draining down of the battery 54 when the apparatus is not in use is effectively prevented.

What I claim is:

1. Apparatus for testing sparking plugs comprising in combination a frame, a compression chamber, means for receiving and holding a plug in said compression chamber, means for locking the plug in said receiving and holding means, an operating handle pivotally mounted on the frame, a spring controlled member pivotally connected to said handle, a cross-bar pivotally connected to said handle, an inspection chamber mounted on the frame below the compression chamber, a pair of sleeve bearings mounted on the inspection chamber, a vertically disposed U-shaped member slidably mounted in said sleeve bearings and carried by the cross-bar, a contact device mounted on the vertically disposed member adapted to coact with the plug, an automatic switch device, connected to a source of electrical energy, actuated by said operating handle, a valve carried by the bracket connected to the compression chamber and to a supply of compressed air and means mounted on the operating handle adapted to actuate said valve and thereby control the supply of air to the compression chamber.

2. Apparatus for testing sparking plugs comprising in combination a frame, a compression chamber mounted thereon, means for receiving and holding a plug in said compression chamber, means for locking the plug in said receiving and holding means, comprising a pair of spring controlled elements, an operating handle pivotally mounted on the frame, a spring controlled member pivotally connected to said handle providing a yielding connection between the handle and the receiving and locking means, a cross-bar pivotally connected to said handle, and adapted to actuate said spring controlled elements, an inspection chamber mounted on the frame below the compression chamber, a pair of sleeve bearings mounted on the inspection chamber, a vertically disposed U-shaped member slidably mounted in said sleeve bearings and carried by the cross-bar, a contact device mounted on the vertically disposed member adapted to coact with the plug, an automatic switch device part of which is carried by the cross-bar, while the other part is carried by the fixed frame, the latter part being connected to a source of electrical energy actuated by said operating handle, a valve carried by the bracket connected to the compression chamber and to a supply of compressed air and means mounted on the operating handle adapted to actuate said valve and thereby control the supply of air to the compression chamber.

3. Apparatus for testing sparking plugs comprising in combination a fixed frame, a compression chamber mounted thereon, means for receiving and holding a plug in said compression chamber, means for locking the plug in said receiving and holding means, an operating handle pivotally mounted on the frame, a cross-bar operatively connected to said handle, an inspection chamber mounted on the frame below the compression chamber, a pair of sleeve bearings mounted on the inspection chamber, a vertically disposed U-shaped member slidably mounted in said sleeve bearings and carried by the cross-bar, a contact device mounted on the vertically disposed member adapted to coact with the plug, one element of an automatic switch device mounted on the cross-bar connected to the said contact device, a bracket secured to the fixed frame, a second element of an automatic switch device mounted on said bracket adapted to coact with the switch element on the cross-bar, a lead connecting the element on the bracket to a source of electrical energy, a valve carried by the bracket connected to the compression chamber and to a supply of compressed air and means mounted on the operating handle adapted to actuate said valve and thereby control the supply of air to the compression chamber.

4. Apparatus for testing sparking plugs comprising in combination a fixed frame, a compression chamber mounted thereon, means for receiving and holding a plug in said compression chamber, means for locking the plug in said receiving and holding means, an operating handle pivotally mounted on the frame, a cross-bar operatively connected to said handle, an inspection chamber mounted on the frame below the compression chamber, bearings mounted on the inspection chamber, a U-shaped member slidably mounted in said bearings and carried by the cross-bar, a contact device mounted on the U-shaped member adapted to coact with the plug, a pair of contact devices mounted on the cross-bar, one of which is connected to the contact member carried by the slidable member, a second pair of contact devices mounted on the fixed frame adapted to coact with the contact devices on the cross-bar, leads connecting the contact devices on the frame to a source of electrical energy, a valve, mounted on the frame, connected to the compression chamber and to a supply of compressed air and means mounted on the operating handle adapted to actuate said valve and thereby control the supply of air to the compression chamber.

5. Apparatus for testing sparking plugs comprising in combination a fixed frame, a compression chamber mounted thereon, means for receiving and holding a plug in said compression chamber, means for locking the plug in said receiving and holding means, an operating handle pivotally mounted on the frame, a cross-bar operatively connected to said handle, an inspection chamber mounted on the frame below the compression chamber, bearings mounted on said inspection chamber, a U-shaped member slidably mounted in said bearings and carried by the cross-bar, a contact device mounted on the U-shaped member adapted to coact with the plug, a contact device mounted on the cross-bar connected to the first named contact member, a contact device mounted on the fixed frame adapted to coact with the contact device on the cross-bar, a lead connecting the contact device on the frame to a source of electrical energy, a valve, mounted on the frame, connected to the compression chamber and to a supply of compressed air and means mounted on the operating handle adapted to actuate said valve and thereby control the supply of air to the compression chamber.

6. Apparatus for testing sparking plugs comprising in combination a fixed frame, a compression chamber mounted thereon, means for receiving and holding a plug in said compression chamber, means for locking the plug in said receiving and holding means, comprising a pair of spring controlled elements, an operating handle pivotally mounted on the frame, a cross-bar operatively connected to said handle, and adapted to actuate said spring controlled elements, an inspection chamber mounted on the frame below the compression chamber, a pair of sleeve bearings mounted on the inspection chamber, a vertically disposed U-shaped member slidably mounted in said sleeve bearings and carried by the cross-bar, a contact device mounted on the vertically disposed U-shaped member adapted to coact with the plug, a pair of contact devices mounted on the cross-bar, one of which is connected to the first named contact member, a bracket secured to the fixed frame, a second pair of contact devices mounted on said bracket adapted to coact with the contact devices on the cross-bar, leads connecting the contact devices on the bracket to a source of electrical energy, a valve carried by the bracket connected to the compression chamber and to a supply of compressed air and means mounted on the operating handle adapted to actuate said valve and thereby control the supply of air to the compression chamber.

7. Apparatus for testing sparking plugs comprising in combination a frame, a compression chamber, means for receiving and holding a plug in said compression chamber, means for locking the plug in said receiving and holding means, an inspection chamber disposed beneath said compression chamber, an operating handle pivotally mounted on the frame, a cross-bar connected to said handle, a vertically disposed U-shaped member secured to said cross-bar and slidably mounted in said frame, a contact device mounted on the U-shaped member adapted to coact with the plug, means for establishing an electric circuit through said plug and means for supplying a predetermined volume of air to the compression chamber, all of said means being simultaneously actuated and controlled by a downward movement of the operating handle.

8. Apparatus for testing sparking plugs comprising in combination a frame, a compression chamber, means for receiving and holding a plug in said compression chamber, means for locking the plug in said receiving and holding means, an inspection chamber disposed beneath said compression chamber, an operating handle pivotally mounted on the frame, a cross-bar connected to said handle, a vertically disposed U-shaped member, secured to the cross-bar and slidably mounted in bearings provided on a fixed part of the apparatus, a contact device mounted on the U-shaped member adapted to coact with the plug, an automatic switch device, connected to a source of electrical energy, a valve connected to the compression chamber and to a supply of compressed air, means for actuating said valve and controlling the supply of air to the compression chamber, all of said means being simultaneously actuated and controlled by the depression of the operating handle and means for holding said handle in the operative position.

FRANK STANLEY SAUNDERS.